United States Patent [19]

Träubel et al.

[11] Patent Number: 5,846,383
[45] Date of Patent: Dec. 8, 1998

[54] PROCESS FOR PRODUCING STRUCTURALLY RESISTANT PAPER

[75] Inventors: Harro Träubel, Leverkusen; Klaus König, Odenthal, both of Germany

[73] Assignee: Bayer Aktiengesellschaft, Leverkusen, Germany

[21] Appl. No.: 945,525

[22] PCT Filed: Apr. 22, 1996

[86] PCT No.: PCT/EP96/01670

§ 371 Date: Oct. 27, 1997

§ 102(e) Date: Oct. 27, 1997

[87] PCT Pub. No.: WO96/35019

PCT Pub. Date: Nov. 7, 1996

[30]    Foreign Application Priority Data

May 4, 1995 [DE] Germany .................. 195 16 405.9

[51] Int. Cl.$^6$ .......................... D21H 17/08; D21H 21/20
[52] U.S. Cl. ................ 162/164.6; 164/135; 164/164.1; 164/164.3; 427/391
[58] Field of Search ............... 162/164.6, 135, 162/164.1, 164.3, 164.7; 427/391, 394, 395

[56]    References Cited

U.S. PATENT DOCUMENTS

| | | | |
|---|---|---|---|
| 3,589,978 | 6/1971 | Kamal et al. | 162/158 |
| 3,989,659 | 11/1976 | Aldrich et al. | 524/608 |
| 4,522,686 | 6/1985 | Dumas | 162/158 |
| 4,616,061 | 10/1986 | Henning et al. | 524/591 |
| 4,670,100 | 6/1987 | Henning et al. | 162/135 |
| 4,786,330 | 11/1988 | Beuzelin et al. | 106/287.25 |
| 5,332,824 | 7/1994 | Rivadeneira et al. | 546/304 |
| 5,463,065 | 10/1995 | Rivadeneira et al. | 546/304 |
| 5,503,714 | 4/1996 | Reiners et al. | 162/164.6 |

FOREIGN PATENT DOCUMENTS

| | | | |
|---|---|---|---|
| 0564912 | 10/1993 | European Pat. Off. | D21H 17/57 |
| 1177824 | 9/1964 | Germany | 39/10 C |
| 9531492 | 11/1995 | WIPO | C08G 18/08 |

OTHER PUBLICATIONS

H.L. Baumgarten, et al., Deinking—Entwicklungsstand einer Schlüsseltechnologie für die Altpapierverwertung, 42, Jahrgang, Heft 10A, pp. 166 –177, (1988).

W. Berndt, Die Chemikalien der Deinking–Prozesse, Wochenblatt für Papierfabrikation, 15, pp. 539 –541, (1982).

Primary Examiner—Stanley S. Silverman
Assistant Examiner—José A. Fortuna
Attorney, Agent, or Firm—Sprung Kramer Schaefer & Briscoe

[57]    ABSTRACT

Process for the production of structurally strong papers (or paper-like materials) which have a terminable strength by treatment of paper in the pulp or of finished paper in the surface with 0.0001 to 50% by weight, preferably 0.01–25% by weight (based on the pulp), of a mixture of isocyanates which contain on average at least two isocyanate groups and of which at least 20% by weight (preferably at least 50%) are those in which the NCO groups are bonded via an organic radical which contains at least one ester and/or amide group in the main chain.

5 Claims, No Drawings

PROCESS FOR PRODUCING STRUCTURALLY RESISTANT PAPER

This application is a 371 of PCT/EP96/01670, filed Apr. 22, 1996.

BACKGROUND OF THE INVENTION

Customary products available on the market for increasing the wet and dry strength of paper are either condensates of epichlorohydrin and polyamines and comprise chlorine bonded organically and in salt form, or polycondensates of formaldehyde which can release formaldehyde again under the influence of heat and action of moisture. Both classes of product therefore present environmental problems since they pollute the waste water with chlorine or formaldehyde.

The use of products containing isocyanate groups for increasing the wet or dry strength of paper is known from EP-A 564 912.

EP-A 582 166 describes the use of polyisocyanates which have been rendered cationic, DE-A 4 319 571 describes polyisocyanates which have been rendered cationic and optionally hydrophilic for this purpose, and German Patent Applications P 4 418 836.6 and P 4 419 572.9 describe the use of such products in multi-component mixtures.

The content of organically bonded halogen (OX content) of the products described in the Applications cited is extremely low; consequently, the AOX pollution (AOX= adsorbable organically bonded halogen) of the waste water of paper mills from this content is very low.

When such products are used industrially, the strengthening of the paper is very high and is also stable under hydrolytic conditions. Recycling of these papers by digestion in dilute sodium hydroxide solution or aqueous ammonia is therefore achieved only with difficulty or not at all.

There was therefore the need for strengthening agents which impart to the paper—without surrendering the advantages of isocyanates—a "terminable" strengthening; i.e. a strengthening which can be cancelled out during breakdown or deinking.

It has now been found that water-emulsifiable compounds which contain isocyanate groups and have on average at least 2 isocyanate groups bridged via ester and/or amide groups per mol are outstandingly suitable as dry and wet strength agents with terminable strengthening for paper, it being possible for these compounds to be employed before sheet formation (use in the pulp), i.e. as an additive to the fibrous substance suspension, or in the surface, i.e. as an application to a sheet of paper which has already been formed.

It has furthermore been found that strengthened papers which can be digested again to a desired extent can be produced if isocyanate mixtures in which at least 20% by weight of the isocyanates contain isocyanate groups bonded via ester and/or amide groups are employed for the strengthening.

SUMMARY OF THE INVENTION

The invention relates to a process for the production of structurally strong papers (or paper-like materials) which have a terminable strength by treatment of paper in the pulp or of finished paper in the surface with 0.0001 to 50% by weight, preferably 0.01–25% by weight (based on the pulp), of a mixture of isocyanates which contain on average at least two isocyanate groups and of which at least 20% by weight (preferably at least 50%) are those in which the NCO groups are bonded via an organic radical which contains at least one ester and/or amide group in the main chain.

DESCRIPTION OF THE PREFERRED EMBODIMENT

Ester groups include carbonate and allophanate groups, but not the urethane group itself. In addition to the polyisocyanates containing ester and/or amide groups, customary polyisocyanates known for strengthening in paper or else customary wet strength agents or retention agents can be present.

The invention also relates to the use of such isocyanate mixtures of the type defined above which contain emulsifiers for better emulsification in water, or in which the emulsifiability has been brought about by reaction of some (5–50%, preferably 8–30%) of the NCO groups with compounds which are capable of salt formation (for example dimethylolpropionic acid or N,N-dimethylethanolamine; (cf. DE-OS 4 319 571 or P 4418836.6)) and/or hydrophilic, preferably monofuctional polyethers (according to DE-OS 4 211 480).

The isocyanates containing ester and/or amide groups can be prepared by reaction of isocyanates with compounds containing OH groups and having ester and/or amide groups by known processes.

Suitable isocyanates are diisocyanates, such as 1,4-diisocyanatobutane, 1,6-diisocyanatohexane, 1,5-diisocyanato-2,2-dimethylpentane, 2,2,4- or 2,4,4-trimethyl-1,6 -diisocyanatohexane, 1,10-diisocyanatodecane, 1,3- and 1,4-diisocyanatocyclohexane, 1-isocyanato-3 ,3 ,5-trimethyl- 5-isocyanatomethyl-cyclohexane (isophorone diisocyanate), 4,4'-diisocyanatodicyclohexylmethane, and mixtures thereof Aromatic isocyanates, for example tolylene diisocyanates and 4,4'-diisocyanato-di-phenylmethane can in principle also be employed; however, because these are of lower fastness to light and have too high a reactivity with respect to water, the aliphatic isocyanates are preferred. Polyisocyanates which have been obtained by modification of the abovementioned diisocyanates or mixtures thereof by known processes and which contain uretdione, urethane, isocyanurate, biuret or allophanate groups, can also be additionally employed as a proportion of the isocyanates.

Compounds containing OH groups and having ester and/or amide groups which are suitable are products which have on average at least 2 OH groups and contain on average at least one ester and/or amide group.

Suitable compounds are, for example, short-chain polyesters such as are formed by esterification of diols and/or triols with dicarboxylic acids or dicarboxylic acid anhydrides, or by transesterification with dicarboxylic -acid esters of short-chain monofunctional alcohols and removal of these alcohols by distillation.

Acid components which may be mentioned are: dimethyl, diethyl or diphenyl carbonate, ethylene glycol carbonate, propylene glycol carbonate, diesters of oxalic acid and malonic acid, succinic acid, glutaric acid and maleic acid and their corresponding anhydrides, and adipic, sebacic, (also hydrogenated) phthalic and hydroxymono- or -dicarboxylic acids (if appropriate in the form of inner esters (lactones)), such as glycolic, tartaric, lactic, citric, hydroxycaproic and hydroxybutyric or ricinoleic acid.

Suitable diols are, for example, the industrially available ethane-, propane-, (1,2-or 1,3-), isomeric butane-, pentane-, hexane-diols and the like and furthermore oligo- or polymers of ethylene glycol and propylene glycol containing ether groups. Cycloaliphatic or aromatic diols may be mentioned—but are not preferred because of the high viscosity of the esters. Suitable triols are, for example, glycerol and trimethylolpropane.

Polyesters are obtained by condensation of the acids and/or their esters of monofunctional alcohols and/or of the anhydrides of the acids with the di- or triols listed by known processes. A narrow molecular weight distribution and therefore a low viscosity can be produced and a low content of components which do not carry an ester can be achieved by use of the OH compounds in excess and subsequent extraction with water or by molecular distillation. Ring-opening transesterification of lactones (for example butyro-, valero- or caprolactone) is likewise particularly suitable. If appropriate, this transesterification can be coupled with the abovementioned measures.

Particularly suitable compounds containing OH groups are obtained by reaction of a di- or hydroxy-carboxylic acid with an alkylene oxide. Defined low molecular weight ester-diols are formed in a simple manner by this procedure.

OH compounds containing amide groups can be prepared from the acids mentioned or esters thereof (lactones) by reaction with hydroxyamines which contain a secondary amino group, such as, for example, adducts of ethylene oxide or propylene oxide on a monoalkylamine (methyl-, ethylamine and the like).

This reaction is particularly suitable because, due to the selectivity of the amino groups, it leads to predominantly defined compounds. The average molecular weights of the OH compounds according to the invention are 148–2000, preferably 148–1000, particularly preferably 148–500.

To prepare the isocyanates to be employed according to the invention, compounds containing NCO are employed with the component containing OH in an NCO/OH ratio of 1.3–20, preferably 1.5–10.

At NCO/OH ratios of >1.5, a content of unreacted isocyanate—which depends on the structure of the isocyanate—remains. For industrial hygiene reasons, these free isocyanates should be removed, for example, by thin film distillation. (In this case, a high NCO/OH ratio is even preferred, because viscosity-increasing chain-lengthening reactions are then largely suppressed.)

Esters of the hypothetical allophanic acid (so-called allophanates), which can be formed by reaction of a urethane group with an isocyanate group, also fall within the scope of the invention. If the reaction of the isocyanates with the compounds containing hydroxyl groups is carried out at $\geq 150°$ C. or in the presence of specific catalysts (such as, for example: HCl gas or organotin compounds), the urethane groups are converted more or less completely into allophanate groups, depending on the reaction time. This measure offers the advantage of obtaining products of high isocyanate content, high functionality and low viscosity, which is of advantage for the envisaged use.

To improve the water-dispersibility or -solubility, the isocyanates can be provided with ionic groups, for example in accordance with DE-OS 4 226 110; or DE-OS 431 957, and/or with hydrophilizing polyether chains analogously to DE-OS 4 211 480. Polyether addition and allophanation to give products which can be employed according to the invention can also be carried out in one step.

The hydrophilizing by superficial reaction of the polyisocyanates with hydrophilizing components is preferred to mixing with external emulsifiers, which is also possible per se, because no concentration of an emulsifier in the backwater occurs by this procedure.

The absorption of the optionally hydrophilized isocyanates onto cellulose in the pulp can be accelerated by introduction of tertiary amino groups. For this, a low content (<30 mol %, preferably <15 mol %) of the isocyanate groups is reacted with an N,N-di-alkyl-alkanolamine (for example in accordance with U.S. Pat. No. 5,332,824).

The water-dispersible polyisocyanates are employed in the process according to the invention in amounts of 0.005 to 50% by weight, preferably 0.1 to 10% by weight, based on the pulp, and they are preferably employed in the paper pulp, that is to say they are added directly to the wood fibre and/or cellulose fibre dispersion. Before the polyisocyanates are employed, especially if these are added to the paper pulp, they can be predispersed with 1–4 times the amount of water, based on the polyisocyanate. This renders processing times of up to 24 hours possible. If water-dispersible aromatic polyisocyanates are used, the processing times are shorter, because of the higher reactivity with respect to water, and are in general less than 8 hours.

The water-dispersible polyisocyanates to be used according to the invention can be employed at the processing temperatures customary in the paper industry. Different processing times for the products to be used according to the invention can result here, depending on the temperature. Thus, for example, there are relatively long processing times with the polyisocyanate from Example A) of DE-OS 4 211 480 (pH 7±1) at 23°–25° C. because $\geq 60\%$ of the isocyanate groups are still present at this temperature after 5 hours. At a temperature of 35° C., with polyisocyanate A) $\geq 50\%$ of the isocyanate groups are still present after 5 hours, and at 50° C. $\geq 33\%$ of the isocyanate groups are still present after 3 hours. The processing time at a certain temperature can thus be influenced by the choice of a suitable polyisocyanate to be used according to the invention.

The water-dispersible polyisocyanates used according to the invention are suitable both for surface treatment and for pulp treatment. The products to be used according to the invention can also be employed in the size press and the like. In this manner, it is possible to produce waterproof papers which are resistant to oil and petrol. These products according to the invention are also outstandingly suitable for laminated papers, because they cause no overloading and therefore no adverse influence on pigment retention, and because their strengthening action can be cancelled out in a simple manner. In this property, they differ from existing systems for increasing wet strength which are currently used for laminates/decorative papers.

The pH of the cellulose pulp or of the paper should preferably be between 5 and 8.5, in particular in the neutral range, on addition of the products to be used according to the invention. pH values below 3 or above 10 should be avoided.

The products to be used according to the invention allow the wet strength of paper to be increased without pollution of the waste water with organic halogen compounds (determined as the AOX value in accordance with DIN 38 409 Part 14). It is also possible to achieve an improvement in the wet tear strength directly in the machine, even under mild drying conditions. That is to say that it is not necessary—as usual—to accept considerable condensation or maturing times of the products. The products are furthermore distinguished in that they do not inhibit the activity of normal whiteners customary in papermaking.

If appropriate, the products can also be employed together with customary cationic fixing agents and retention agents or conventional agents for increasing the wet strength.

In particular, the AOX pollution of the waste water caused by these conventional wet-strength agents can be reduced in this way. Furthermore, the wet-strength action is usually increased synergistically in this manner, and the retention of pigments, fillers and the like is improved.

The water-dispersible polyisocyanates to be used according to the invention can be employed as a mixture with 0.005 to 50 parts by weight, preferably 0.1 to 10 parts by weight, of a retention agent, the amount of retention agent being based on the paper pulp.

The water-dispersible polyisocyanates to be used according to the invention can be employed as a mixture with 1 to 400 parts by weight, preferably 10 to 100 parts by weight, of a polyamidoamine-epichlorohydrin resin according to DE-AS 1 177 824, based on the polyisocyanate.

To test the terminable strengthening, the papers which have been treated and subjected to after-condensation can be broken down again in a pulper or subjected to deinking conditions (H. L. Baumgarten et al. "Deinking-Entwicklungsstand einer Schlüsseltechnologie für die Altpapierverwertung" [Deinkng-Development Status of a Key Technology for Waste Paper Utilization], Das Papier 42 (1988) V166–V177 and W. Berndt "Die Chemikalien der Deinking-Prozesse" [The Chemicals of the Deinking Processes] Wochenblatt 15 (1982) 533–541). A sheet of paper is then produced again and it is investigated whether this sheet is speck-free (i.e. free from poorly digested, too easily produced fibre agglomerates). It is easier to test a sheet for wet strength in the customary manner, and then to expose an identical sheet to a concentrated ammonia solution or a 1N sodium hydroxide solution at 50° C. for 24 hours, to neutralize it, if appropriate, and to dry it and to determine the wet strength once again.

Papers which can easily be broken down are obtained if the wet strength of the paper treated with alkali is only 75%, preferably only 50%, and particularly preferably <30%, of the initial wet strength.

Preparation examples for the isocyanates according to the invention

EXAMPLE A 1164 g (6 mol) of tetraethylene glycol, 184 g (2 mol) of glycerol and 792 g (6 mol) of dimethyl malonate were heated at 140° C. under nitrogen with the addition of 150 mg of dibutyltin dilaurate as a transesterification catalyst. The distilling off of methanol which starts was maintained by gradually increasing the temperature to 180° C. Thereafter, the condensation was brought to completion in the course of 4 hours at the same temperature and under decreasing pressure (finally 15 mbar). A low-viscosity, on average trifunctional oligoester of OH number 192 was obtained.

877 g (3 mol of OH) of the oligoester were stirred with 1764 g (10.5 mol) of hexamethylene diisocyanate at 80° C. under nitrogen for 4 hours. Thereafter, the isocyanate content had fallen to a calculated 28.6%. The crude product was freed from monomeric diisocyanate by distillation twice on a molecular evaporator (jacket temperature 140° C. pressure 0.5 mbar). 1350 g of a yellowish oil having an NCO content of 8.3% and a viscosity of 9080 mPa.s at 25° C. were obtained.

EXAMPLE B 2565 g (22.5 mol) of ε-caprolactone were stirred with 1005 g (7.5 mol) of trimethylolpropane under nitrogen for 8 hours at 200° C. Thereafter, only traces of the monomeric lactone were still detectable. The low-viscosity oligoester had an OH number of 347.

485 g (3 mol of OH) of the oligoester were stirred with 1260 g (7.5 mol) of hexamethylene diisocyanate at 65° C. for 1 hour and at 80° C. for 3 hours, and thereafter the calculated NCO content (28.9%) had been reached.

After molecular distillation twice, a viscous oil of viscosity 21 250 mPa.s having an NCO content of 9.9% was obtained.

75 parts of the isocyanate were diluted with 25 parts of methoxypropyl acetate and reacted with 25 parts of a polyethylene glycol monomethyl ether (molecular weight= 350) at 80° C. in the course of 4 hours for better emulsifiability in water. The resulting solution had an NCO content of 3%.

EXAMPLE C

A low-viscosity oligoester of OH number 458 was prepared analogously to Example B from s-caprolactone and trimethylolpropane in a molar ratio of 2:1.

After reaction with hexamethylene diisocyanate in excess (NCO:OH=5) and molecular distillation, a prepolymer of low monomer content having a viscosity of 23,400 mPa.s at 25° C. and an NCO content of 11.33% was obtained.

Modification with 25% of polyethylene glycol monomethyl ether (molecular weight=350) in methoxypropyl acetate gave a water-emulsifiable liquid having an NCO content of 3.45%.

EXAMPLE D 2226 g (21 mol) of diethylene glycol were reacted with 1197 g (10.5 mol) of ε-caprolactone under nitrogen at 200° C. for 5 hours. The crude product was subjected to molecular distillation twice under 0.3 mbar, the jacket temperature being 100° C. in the first pass and 120° C. in the second.

An ester-diol of OH number 421.5 which was largely free from diethylene glycol was obtained.

266 g of the ester-diol (2 mol of OH) were mixed with 1718 g (10.22 mol) of hexamethylene diisocyanate, and 6 g of gaseous HCl (0.16 mol) were passed into the mixture. After the mixture had been stirred at 110° C. for 8 hours, the NCO content of the mixture had fallen to 34.67%, which corresponds to complete reaction of the urethane groups initially formed with further isocyanate to give allophanate groups.

After molecular distillation twice at 190° C. and 0.5 mbar, a polyisocyanate of low monomer content which had a viscosity of 2970 mPa.s at 25° C. and an NCO content of 15.7% was obtained.

For better emulsifiability in water, the product was modified with polyethylene glycol monomethyl ether as in Examples B and C. it being possible to dispense with an addition solvent (NCO:9.35).

EXAMPLE E 133 g (0.5 mol) of the ester-diol from Example D were mixed with 255 g (0.5 mol) of polyethylene glycol monomethyl ether (molecular weight=550) and 1250 g (7.44 mol) of hexamethylene diisocyanate, and 4 g (0.11 mol) of gaseous HCl were added. After 6 hours at 110° C. complete allophanation of the urethane groups was achieved (NCO:30.4%).

After molecular distillation twice at 140° C. and 0.4 mbar, a low-viscosity polyisocyanate having an NCO content of 12.07% and a viscosity of 650 mPa.s at 25° C. was obtained. The product was readily emulsifiable in water, due to the content of polyethylene glycol polyether, and required no further modification for use.

EXAMPLE F

Analogously to Example E, 200 g (0.75 mol) of the same ester-diol and 128 g (0.25 mol) of polyethylene glycol monomethyl ether (molecular weight=550) were reacted with 1470 g (8.75 mol) of hexamethylene diisocyanate in the presence of 4 g of HCl at 110° C. in the course of 6 hours, and the resulting crude product (NCO:32.5%) was freed from monomeric diisocyanate by molecular distillation.

A water-emulsifiable polyisocyanate having an NCO content of 13.84% and a viscosity of 1340 mPa.s at 25° C. was obtained.

EXAMPLE G 1 g of N,N'-dimethylethanolamine and 0.05 g of 2-chloropropionic acid were added to 100 g of the isocyanate of Example B diluted to 75% strength with methoxypropyl acetate, and the mixture was kept at 80° C. for 24 hours. A product which contained 1.01% of NCO was formed.

EXAMPLE H 1 g of N,N-di-ethylethanolamine and 0.1 g of 2-chloropropionic acid were added to 100 g of an isocyanate of Example C diluted to 75% strength (with methoxypropyl acetate), and the mixture was stirred at 80° C. for 10 hours. A prepolymer with 2.22% of NCO was formed.

EXAMPLE J 60 parts of the isocyanate from Example C were dissolved in 20 parts of methoxypropyl acetate and reacted with 20 parts of a polyethylene glycol monomethyl ether (of molecular weight 350) and 1 part of diisopropyl-ethanolamine. An isocyanate having 4.0% of NCO and a viscosity of 1520 mPa.s at 25° C. was formed.

EXAMPLE K 340 g of isocyanate prepared according to Example F were reacted with 17 g of polyethylene glycol monoethyl ether (molecular weight 350) and 4.5 g of N,N-dimethylethanolamine at 60° C. An isocyanate which can be emulsified in water even better than isocyanate F and has an NCO content of 11.6% and a viscosity of 1750 mPa.s at 25° C. was formed.

USE EXAMPLES

Example 1

This example shows the activity in the paper pulp of the polyisocyanates to be employed according to the invention.

A mixture of 50% each of bleached birch sulphate cellulose and pine sulphate cellulose was beaten in a beater at a pulp consistency of 2.5% to a Schopper-Riegler degree of freeness of 30°. 100 g of this mixture were introduced into a glass beaker and diluted to 1000 ml with water.

The amounts of polyisocyanate A (based on the fibre substance) stated in the following table were introduced into the glass beaker as an aqueous dispersion. This dispersion was prepared as follows:
10 g of polyisocyanate A were emulsified, with the aid of
1 g of Emulgator VA (Bayer AG; an emulsifier based on alkoxylated stearylurethane), in
89 g of water.
5%, 10% and 20% (based on the cellulose fibres) of this emulsion (based on the dispersed isocyanate) were added.

After a stirring time of 3 minutes, sheets of paper having a weight per unit area of about 80 g/m² were formed with the contents of the glass beakers on a sheet-forming machine (Rapid-Köthen device). The sheets of paper were dried at 85° C. in vacuo under 30 mbar for 8 minutes and, after 10 minutes, after-heated in a drying cabinet at 110° C.

After conditioning, 5 test strips 1.5 cm wide were cut out of each sheet of paper and immersed in distilled water for 5 minutes. Thereafter, the wet strips were immediately tested for their wet breaking load in a tensile tester. A wet-strength agent with isocyanate groups, prepared according to Example 1 of EP-A 564 912, was furthermore also tested as a standard.

The paper with polyisocyanate A according to the invention (drying at 85° C. 8 minutes) had the following wet strengths:

|  | 5% | 10% | 20% |
| --- | --- | --- | --- |
| Isocyanate A | 4.6 | 7.6 | 8 |
| Isocyanate of Example 1 EP-A 564 912 | 9.3 | 9.7 | — |
| Isocyanate of Example 1 EP-A 564 912 + emulsifier | 9.5 | 12.7 | — |

Example 2

The experiments of Example 1 were repeated on a pulp of 80% pine sulphate and 20% birch sulphate (degree of freeness 35%) with a dispersion for which 3.0% of isocyanate A was dispersed in 91% of tap water with 6.0% of Emulgator VA.

After production of the, sheet of paper, condensation was carried out at 110° C. for 10 minutes. The resulting sheet had the following wet strengths:
1% of A: 1.4 N
5% of A: 2.2 N
10% of A: 7.1 N Under breaking down conditions, the paper was broken down again at 50° C. and a pH of 11 with 2.5% of potassium persulphate within a stirring time of 40 minutes.

A new sheet produced therefrom was free from specks.

Example 3

These examples show the action of the products according to the invention in coatings.

75 g/m² coated base paper comprising 70% birch sulphate and 30% pine sulphate (degree of freeness 35%) and 20% chalk (as well as 0.5% of a retention agent (RETAMOL C 01 from Bayer AG) were treated in the size press with a dispersion which comprised the following products. The paper in each case absorbed the amount of isocyanate indicated. After measurement of the wet breaking load, the papers—in order to determine their ability to be broken down again—were immersed in 1N NaOH or NH₃ solution at 50° C. for 1 hour, heated and cooled, and, after standing at room temperature for 16 hours, the wet breaking load was determined again. If the wet breaking load did not differ substantially from that of the untreated paper, then the paper also cannot be digested again.

| Example I EP-A 564 912 Comparison | | Isocyanate A | | Isocyanate B | | Isocyanate C | | Isocyanate D | Isocyanate E | Isocyanate F | | |
|---|---|---|---|---|---|---|---|---|---|---|---|---|
| 0.5% | 1% | 0.5% | 1% | 0.5% | 1% | 0.5% | 1% | 0.5% | 0.5% | 0.5% | 1% | |
| 12 | 12.7 | 4.6 | 9.3 | 3.8 | 12.3 | 7.9 | 12.5 | 13.3 | 13.3 | 10.5 | 13.4 | Wet breaking load without alkili treatment |
| 10 | 12.7 | 0.5 | 0.6 | 0.5 | 1.5 | 4.4 | 7.7 | 9.6 | 9.8 | 7.6 | 9.8 | Wet breaking load after NaOH treatmeat (pH 14) |
| 11 | 13.5 | 2.5 | 7.9 | 2.1 | 10.9 | 6.5 | 11.4 | 11.7 | 12.1 | 9.4 | 12.7 | Wet breaking load after ammonia treatment (pH 12) |

Example 4

Screenings were treated in the pulp with in each case the stated amount of freshly emulsified isocyanate analogously to Example 1 and the papers thus produced were tested. The wet breaking load was determined in each case after condensation (30 minutes at 110° C.) and after a hydrolysis treatment.

The following results were obtained:

| Example | 4.1 | 4.2 | 4.3 | 4.4 | 4.5 | 4.6 | 4.7 | 4.8 | 4.9 | 4.10 | 4.11 |
|---|---|---|---|---|---|---|---|---|---|---|---|
| Active substance in % | | | | | | | | | | | |
| Example 1 EPA 564 912 | 1.5 | 0.5 | — | — | — | — | — | 1.5 | 0.5 | — | — |
| Example 1 P 4 319 571.1 | 0 | 1.5 | 2 | 1.5 | 0.5 | — | — | — | — | 1.5 | 0.5 |
| Isocyanate C | 0.5 | — | — | 0.5 | 1.5 | — | — | — | — | — | — |
| Isocyanate E | — | — | — | — | — | 2.0 | — | 0.5 | — | 0.5 | — |
| Isocyanate F | — | — | — | — | — | — | 2.0 | — | 1.5 | — | 1.5 |
| Wet breaking load [N] | 12.6 | 9.4 | 18.4 | 18.2 | 12.6 | 11.1 | 9.5 | 12.8 | 11.7 | 18.2 | 14.7 |
| Wet breaking load [N] after 1 N NaOH treatment | | | | | | | | | | | |
| 20 hours 50° C. | 5.0 | 2.8 | 14.4 | 9.8 | 5.0 | 1.9 | 1.9 | 6.2 | 3.1 | 11.4 | 7.7 |
| 63 hours 50° C. | 3.6 | 2.1 | 13.6 | 8.5 | 3.1 | 1.4 | 1.2 | 3.8 | 2.2 | 5.3 | 2.8 |

Example 5

0.2% of RETAMINOL K (cationic retention agent from Bayer AG) and the amounts of isocyanate stated in the table, in emulsified form, were added to a cellulose mixture comprising 30% pine sulphate and 70% eucalyptus, to which 40% titanium dioxide had been added, sheets were formed with this mixture on a Rapid-Köthen and the ash and wet strength were determined. To determine the terminable wet strength, samples were treated with 1N NaOH at 50° C. for 20 hours and the wet strength was determined again. If it was significantly lower than in the sample not treated with NaOH, the resulting sheets can easily be broken down again.

| Example | 5.1 | 5.2 | 5.3 | 5.4 | 5.5 | 5.6 | 5.7 | 5.8 | 5.9 | 5.10 |
|---|---|---|---|---|---|---|---|---|---|---|
| RETAMINOL K (%) | 0.2 | 0.2 | 0.2 | 0.2 | 0.2 | 0.2 | 0.2 | 0.2 | 0.2 | 0.2 |
| NADAVIN DHN comparison (%) | 2.25 | 15 | — | — | — | 8 | — | — | — | — |
| Isocyanate E (%) | — | — | 2.8 | 15 | — | — | — | — | — | — |
| Isocyanate F (%) | — | — | — | — | 2.8 | 15 | — | — | 8 | — |
| Example 1 EP-A 564 912 comparison (%) | — | — | — | — | — | — | 2.8 | 15 | — | 8 |
| Example 1 P 4 319 571.7 comparison (%) | — | — | — | — | — | — | — | — | 2.8 | 15 |
| Ash (%) | 21 | 12.1 | 16.6 | 16.2 | 15.4 | 14.2 | 18.5 | 19.9 | 17.1 | 21.5 |
| Wet breaking load [N] | 16.6 | 19.2 | 7.7 | 9.8 | 6.8 | 11.2 | 6.7 | 7.4 | 13.8 | 12.3 |
| Wet breaking load after hydrolysis (20 hours 1 N NaOH at 50° C.) | — | 12.1 | — | 3.8 | — | 4.0 | — | 7.6 | — | 11 |

All the % data are based on the active substance

-continued

| Example | 5.1 | 5.2 | 5.3 | 5.4 | 5.5 | 5.6 | 5.7 | 5.8 | 5.9 | 5.10 |
|---|---|---|---|---|---|---|---|---|---|---|

Examples 5.1 and 5.2 clearly show how, with conventional wet-strength agents, $TiO_2$ retention decreases due to overloading. At a lower concentration of the conventional wet-strength agent DHN, the ash is high; at 21%, and at the higher concentration of 15% it is low, at 12.1%. With the wet-strength agents according to the invention, the ash content is largely independent of the concentration used.

Example 6

2% (dry) of Comparison Example 1 from EP-A 564 912 (Experiment 6.1), and isocyanate G (Experiment 6.2) and isocyanate H (Experiment 6.3), are added to a cellulose mixture comprising 80% pine sulphate and 20% birch sulphate.

The following wet strengths (after drying at 110° C. for 3 minutes) were measured the following day:

| Experiment No. | Wet breaking load |
|---|---|
| 6.1 | 5.0 |
| 6.2 | 9.3 |
| 6.3 | 12.7 |

After storage over an ammonia atmosphere, the values dropped to:
6.1 3.5
6.2 1.0
6.3 1.2

Example 7

This example is intended to illustrate the comparability of the hydrolysis test (ageing for 8 or 10 hours with 1N NaOH or over ammonia vapour at 50° C.) with the actual results of breaking down:

An 80 g/m² paper comprising 70% birch sulphate and 30% pine sulphate (degree of freeness 35), which comprised 12.5% chalk and had a wet uptake of 85%, was treated with various wet-strength agents in the size press. The wet breaking load of these papers was determined. The papers were then subjected to hydrolysis (20 hours, 50° C. in 1N NaOH), and the wet breaking load was determined again in the manner described. Identical papers were broken down again in 1N NaOH at 50° C. for 30 minutes, the fibre slurry formed was neutralized and a sheet was formed again. This sheet was then examined and evaluated for specks, which can serve as a measure of the ability to be broken down again. (Rating 1: cannot be broken down, fairly large pieces of the original paper still to be seen, rating 5:

speck-free paper).

| Product | NCO content | Active compound content (%) | Viscosity (mPas) | % | % | % | % | % | % | % | % |
|---|---|---|---|---|---|---|---|---|---|---|---|
| NADAVINDHN | — | 15 | 70 | 0.5 | 1 | — | — | — | — | — | — |
| Example 1 EP-A 564 912 | 12.8 | 80 | 500 | — | — | 0.5 | 1 | — | — | — | — |
| Example J | 4 | 80 | 1520 | — | — | — | — | 0.5 | 1 | — | — |
| Example K | 11.6 | 100 | 1750 | — | — | — | — | — | — | 0.5 | 1 |
| Wet breaking load (N) | | | | 8.2 | 11.8 | 12.8 | 14.8 | 10.2 | 15.7 | 15.4 | 17.9 |
| Wet breaking load 20 hours, 1N NaOH, 50° C. | | | | 2.2 | 4 | 10.2 | 11.9 | 0.4 | 0.6 | 5.3 | 7.5 |
| Residual wet breaking load after hydrolysis in % | | | | 27 | 34 | 80 | 80 | 4 | 4 | 34 | 42 |
| Ability to be broken down: appearance of the re-formed paper | | | | | 4 | | 1 | | 5 | | 4 |

We claim:

1. Process for the production of structurally strong papers having a terminable strength comprising, adding to a paper-making pulp or to the surface of a finished paper 0.0001 to 50% by weight (based on the pulp), of a mixture of isocyanates which contain on average at least two isocyanate groups and of which at least 20% by weight are those in which the NCO groups are bonded via an organic radical which contains at least one ester and/or amide group in the main chain.

2. Process according to claim 1, further comprising, the addition of isocyanate size and/or wet strength and/or retention agents.

3. Process according to claim 1, wherein the isocyanates are hydrophilized by proportionate reaction with monofunctional polyethylene glycol ethers and/or by cationic or anionic groups.

4. Process according to claim 1, wherein the isocyanates are aliphatic.

5. Process according to claim 1, wherein the isocyanate mixture comprises an isocyanate containing ester and/or amide groups in an amount such that the finished treated paper has, after hydrolysis in 1N NaOH at 50° C. for 8 hours, not more than 75% of the wet strength of the non-hydrolysed paper.

* * * * *